United States Patent [19]

Minor

[11] Patent Number: 4,971,543
[45] Date of Patent: Nov. 20, 1990

[54] PRESS TOOL FOR PLASTIC MOLDINGS

[75] Inventor: Roman Minor, Laumersheim, Fed. Rep. of Germany

[73] Assignee: Basf Aktiengesellschaft, Ludwigshafen, Fed. Rep. of Germany

[21] Appl. No.: 253,500

[22] Filed: Oct. 5, 1988

[30] Foreign Application Priority Data

Oct. 7, 1987 [DE] Fed. Rep. of Germany ....... 3733873

[51] Int. Cl.$^5$ .............................................. B29C 43/04
[52] U.S. Cl. ..................................... 425/193; 425/411
[58] Field of Search ............... 425/190, 193, 195, 411, 425/412, 441, 450.1, 451.9, DIG. 5, 352, 353, 595, 589, 577, 438; 249/161, 162, 169, 163

[56] References Cited

U.S. PATENT DOCUMENTS

| | | | |
|---|---|---|---|
| 1,623,022 | 3/1927 | Sturgeon | 425/407 |
| 2,703,435 | 3/1955 | Watson | 425/411 |
| 2,913,766 | 11/1959 | Haller | 425/411 |
| 3,373,460 | 3/1968 | Ladney | 425/DIG. 5 |
| 3,378,885 | 4/1968 | Dart | 425/407 |
| 3,524,220 | 8/1970 | Davison | 425/195 |
| 3,843,088 | 10/1974 | McLoughlin et al. | 249/144 |
| 4,056,341 | 11/1977 | Moore | 425/411 |
| 4,184,835 | 1/1980 | Talbot | 425/577 |
| 4,306,851 | 12/1981 | Thune | 425/468 |
| 4,460,326 | 7/1984 | Croseck et al. | 425/411 |
| 4,477,406 | 10/1984 | Luchsinger | 264/275 |
| 4,502,660 | 3/1985 | Luther et al. | 249/144 |
| 4,620,958 | 11/1986 | Wiechard | 264/297.2 |

Primary Examiner—Willard Hoag
Attorney, Agent, or Firm—Keil & Weinkauf

[57] ABSTRACT

Press tools are used for processing plastics, in particular fiber-reinforced plastics, to moldings in presses. They essentially consist of a lower part which can be firmly connected to the press frame and an upper part which is movable with respect to the said lower part and can be connected to a frame drive. The upper and lower parts of the tool, together with drive elements for driving together parts which define the mold cavity, form a basic unit. The parts are replaceably held in the basic unit and are guided in the said unit.

11 Claims, 6 Drawing Sheets

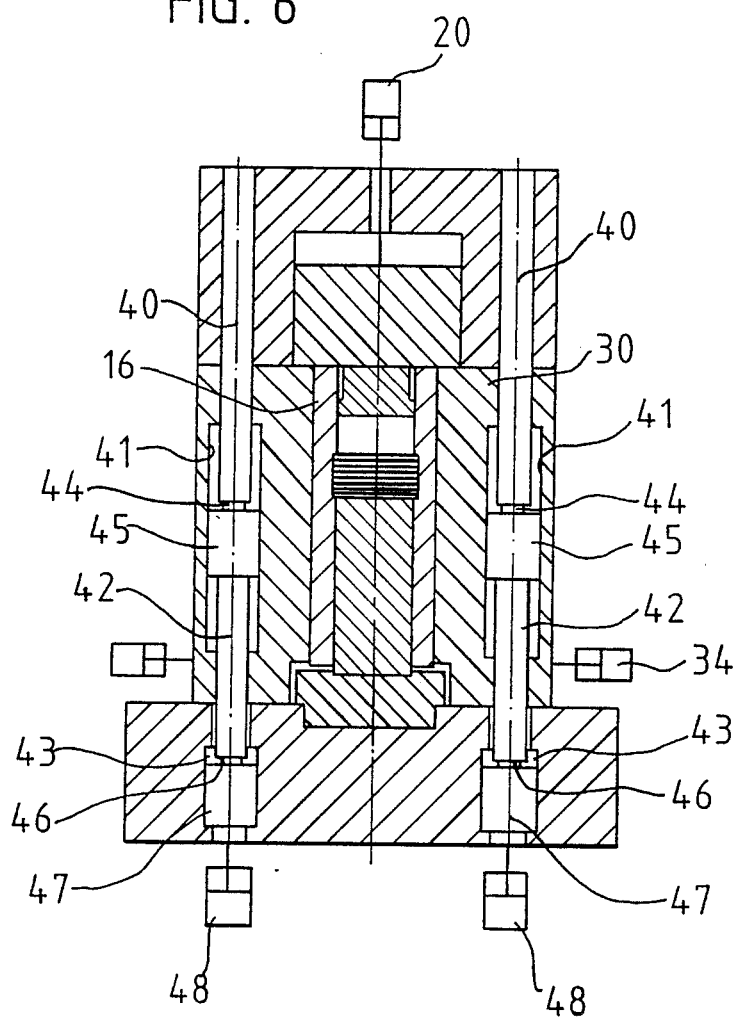

PRESS TOOL FOR PLASTIC MOLDINGS

The present invention relates to a press tool for the production of moldings from plastics, in particular from fiber-reinforced plastics, comprising a lower part which can be firmly connected to the press frame and an upper part which is movable with respect to the said lower part and can be connected to a frame drive.

Moldings, for example of fiber-reinforced plastics, such as leaf springs, are usually produced in presses using exchangeable press tools. Thus, for moldings of different shapes or dimensions, an appropriately designed, complete tool has to be provided in each case.

Because of stress, the moldings are frequently provided with radii on the side walls. By using positive molds, a radius can be produced on one side through the cavity of the female mold directly during the pressing process. This is generally effected on the underside of the molding, the tension side. If it were also desired to form the upper radii on the compression side by means of the tool, two sharp cuts in the male mold would result. For the required dimensions, these can be produced only with very great expense and would limit the service life of the tool to a minimum. The necessary radii are therefore milled in a subsequent processing step. The disadvantages are the disturbance of the structure of the molding by partition of the fiber strands during milling, and the additional manufacturing cost.

Furthermore, the closed and rigid structure of such a tool makes handling more difficult with regard to charging with raw material and removal of the moldings. Thus, for example, the material to be pressed has to be preheated outside the mold.

Accordingly, the conventional method for producing moldings by compression molding is expensive in terms of both equipment and process engineering.

It is an object of the present invention to provide a press tool which, in the production of plastic moldings, reduces the cost of both tools and process engineering compared with the conventional production technique.

We have found that this object is achieved by a press tool of the type described at the outset, wherein, according to the present invention, the upper and lower parts of the tool, together with drive elements for driving together parts which define the mold cavity, form a basic unit, and the shape-imparting parts are replaceably held in the basic unit and the drivable parts among these can be detachably connected to the drive elements.

Details and various embodiments and advantages of the press tool are described below with reference to the drawing.

FIG. 6 shows the press tool according to FIG. 5, in the closed state.

Figure 1:
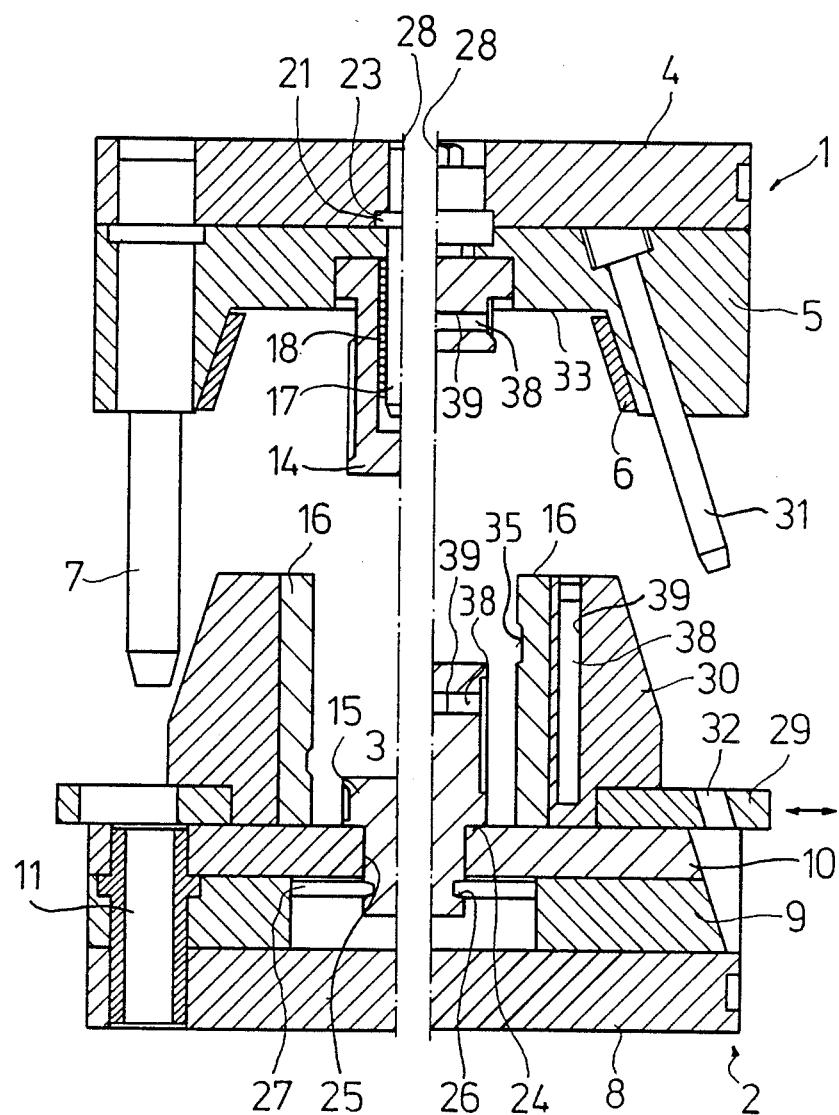
FIG. 1 shows the press tool in cross-section, in the open state.
Figure 2:
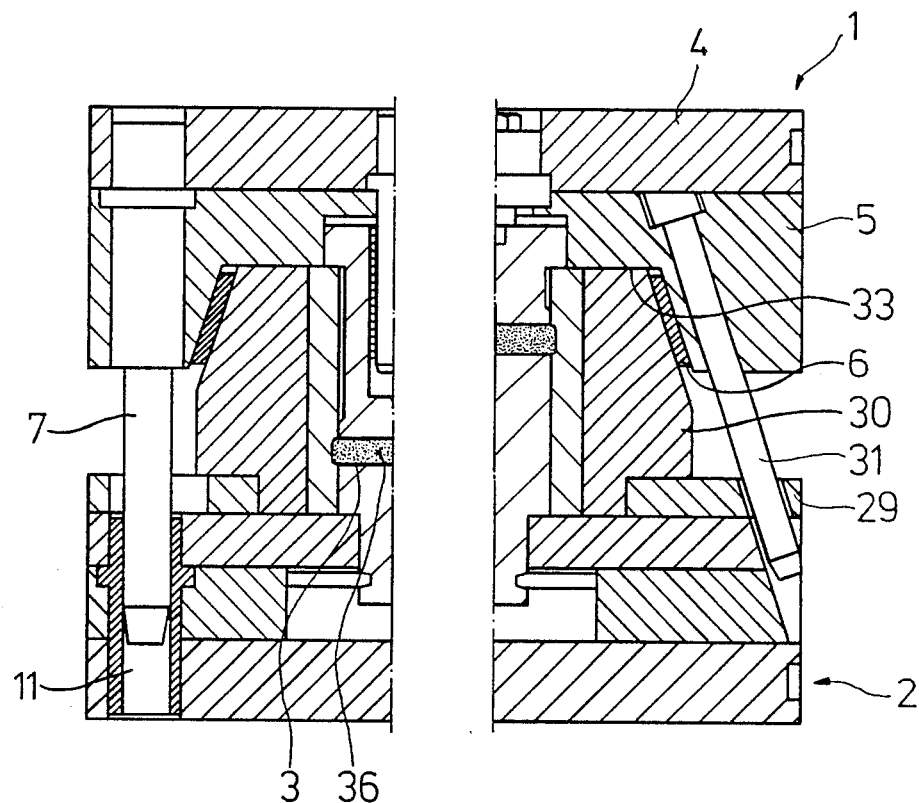
FIG. 2 shows the press tool in cross-section, in the closed state.

The press tool essentially consists of a basic unit having the upper part 1 and the lower part 2 and of the parts which form the mold cavity 3 and are replaceable (FIGS. 1 and 2).

The upper part consists of an upper clamping plate 4 with a locking conical plate 5, which is provided with thrust bars 6 in the conical part. Guide columns 7 are provided in the edge region of the upper part.

The lower part 2 of the tool has a lower clamping plate 8 which receives an intermediate plate 10 by means of spacer bars 9. The edge region of the lower part is provided with the guide sleeves 11 corresponding to the guide columns 7, so that the upper and lower parts can be centered and moved parallel to one another. The upper part is driven in the press frame (not shown in the drawing), in which the two tool parts 1 and 2 are inserted, in a known manner, mechanically, for example by means of a cam, or hydraulically by means of a working cylinder.

Figure 3:
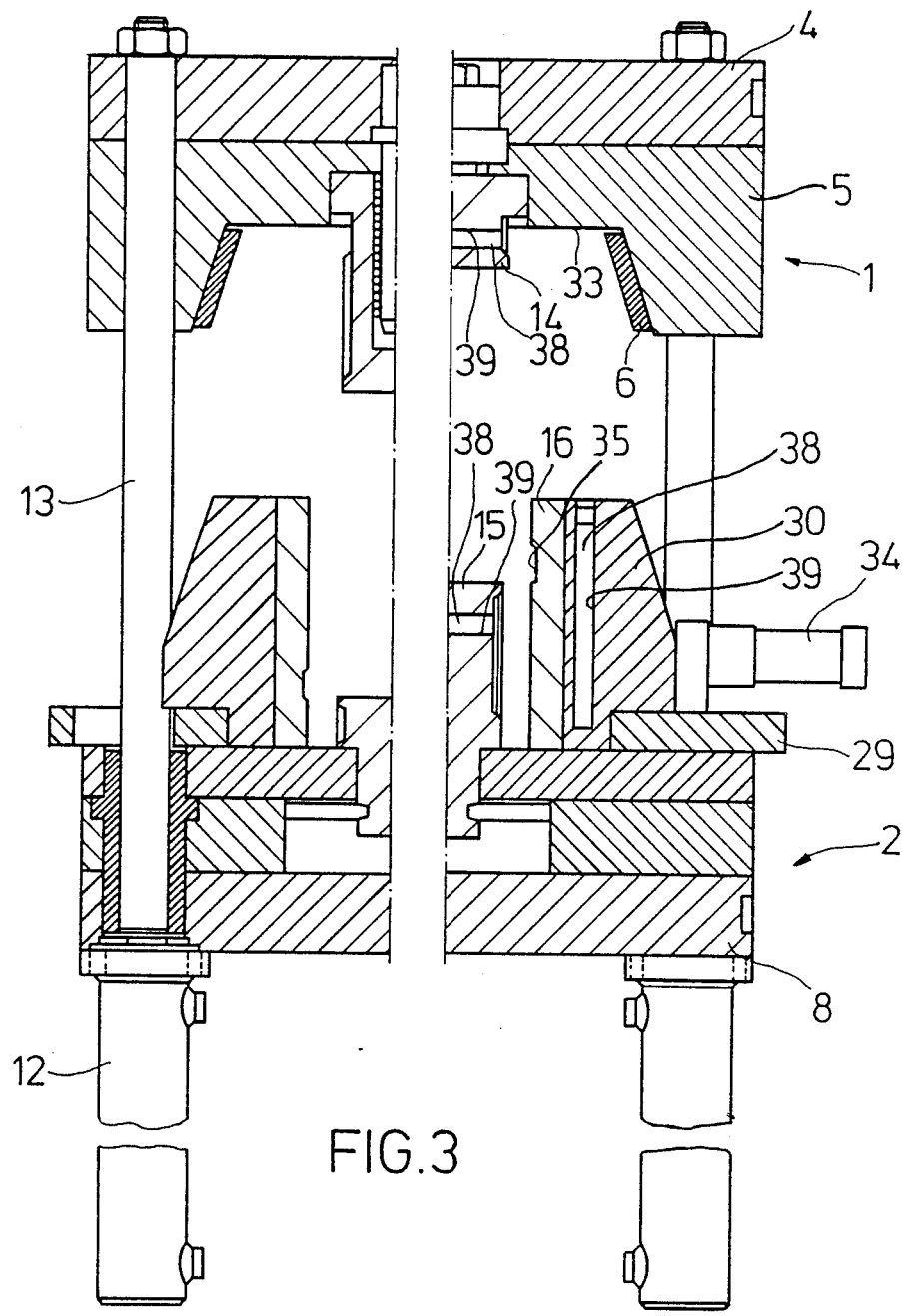
FIG. 3 shows the press tool in cross-section, with its own drive for opening and closing.

If the press tool is provided with its own drive, it can be operated without the press. As shown in FIG. 3, this is achieved by fastening working cylinders 12, for example, to the lower clamping plate 8 of the lower part 2, the piston rods 13 of the said cylinders receiving at their free end the upper part 1 in order to guide and to drive the latter. Consequently, the tool can be opened and closed and the locking force can be applied. From the foregoing it will be clear that the term "press tool" is used herein throughout in the broadest sense. That is, it can denote either a modular apparatus which is removably inserted between the platens or the like of a, for example hydraulic, "press", or it can denote a substantially self-contained molding press complete with the mold cavity defining parts.

The shape-imparting parts comprise an upper punch 14 held in the upper part 1, a lower punch 15 held in the lower part 2 and two side walls 16. All parts can be driven toward one another to form the mold cavity 3 within the tool and are provided with the shape-imparting profile on their surfaces.

Figure 4:
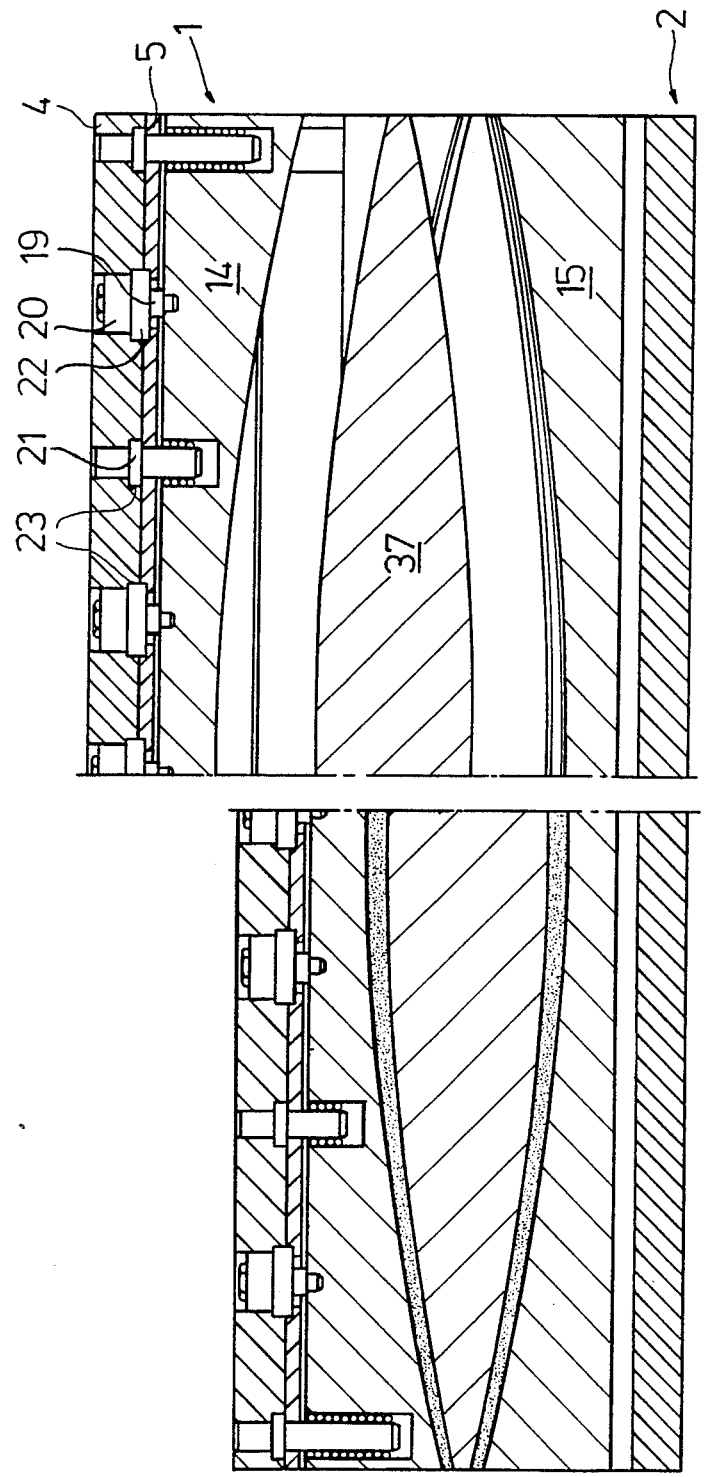
FIG. 4 shows a partial longitudinal section through the press tool, with a mold core.

The upper punch 14 which exerts the compressive force is axially displaceable on guide pins 17 by means of ball bearing 18, and is detachably held on piston rods 19 (FIG. 4) of working cylinders 20 by a screw connection. Guide pins and working cylinders are clamped by means of collar-like extensions 21, 22 in holes 23 between the upper clamping plate 4 and the locking conical plate 5.

The lower punch 15 is held, so that it can be displaced along the length of the tool, on a step 24 in an elongated orifice 25 of the intermediate plate 10, and is fastened by means of pins 27 which are guided in the spacer bars 9 and engage in lateral holes 26 in the punch. This embodiment permits rapid and simple replacement of the punch by lateral removal from the lower part.

It is of course also possible to reverse the arrangement of the punch with regard to axial displaceability and stationary holding, so that, similarly to the above description, the lower punch is axially displaceable and the lower part 2 is equipped with the corresponding guides and working cylinders, and the upper punch is laterally displaceable and fixable.

The two side walls 16 are arranged symmetrically with respect to the tool axis 28 and can be driven toward the axis on the intermediate plate 10 in guide rails 29 by means of slide elements 30. Under the movement of the upper part 1, guide elements 31 fastened therein enter holes 32 in the side walls and thus carry the slide elements with the side walls into the closed position of the mold, in which, as shown in FIG. 2, they are exactly positioned by the inner surface 33 of the locking conical plate 5 and the thrust bars 6. When the upper part is driven back after the compression process, the slide elements with the side walls are retracted into the open position.

Instead of restrained guidance by the upper part, the slide elements 30 together with the side walls 16 can also be driven by working cylinders 34 in accordance with the embodiment in FIG. 3.

A groove 35 corresponding to the intended molding contour is incorporated in the side walls 16 of the mold, rounded edges being formed on the molding 36 by the said groove during the compression process.

In an advantageous embodiment of the press tool (FIG. 4), a mold core 37 is arranged between the upper punch 14 and the lower punch 15, so that a double mold cavity is formed. In this case, of course, the upper and lower punches have the same surface profile.

It is also advantageous if the shape-imparting parts 14, 15, 16 are heatable in order to heat the material to be molded. This can be achieved by using, for example, electrical heating elements 38 in holes 39 of the parts. It is advantageous in this respect to heat the side walls 16 indirectly via the slide elements 30. Where the parts are made of ceramic materials, heating can also be effected dielectrically by means of high frequency electromagnetic energy transfer.

Figure 5:
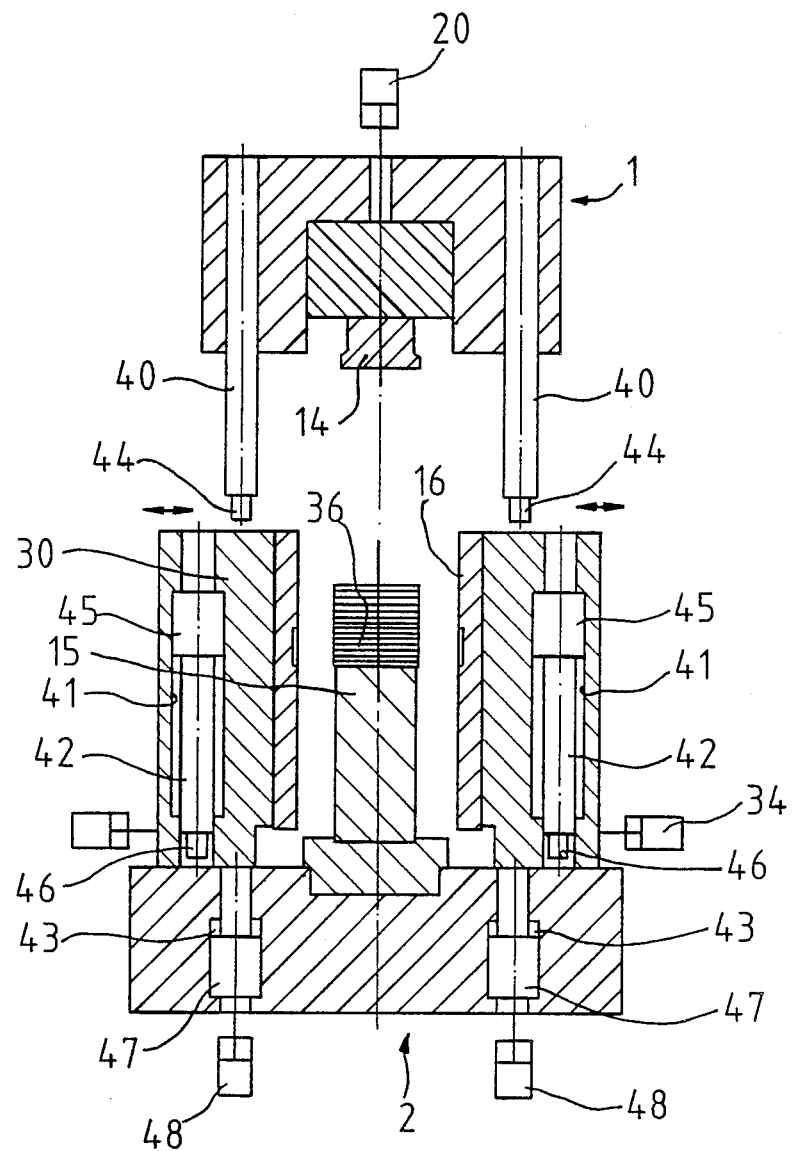
FIG. 5 shows the press tool in cross-section, with a locking system for the upper and lower parts which is parallel to the axis, in the open state.

FIGS. 5 and 6 show an embodiment of the press tool in which the upper part 1, which is brought into the closed position by means of a working cylinder, and the side walls 16 are locked by means of a three-part locking system parallel to the axis. The first part consists of rods 40 which, in the upper part, are fastened symmetrically with respect to the tool axis 28. In the second part, the slide elements 30 have holes 41, which are arranged coaxially with the rods when the slide elements are in the closed position. Further rods 42, which in turn are coordinated with holes 43 in the third part, the lower part 2, are displaceable in these holes. Connection of the three-part system through frictional force to lock the tool parts in the closed position can be effected by providing the free end of the rods 40, 42 on the one hand and, on the other hand, the rods 42 and the holes 43 with locking elements 44, 45 and 46, 47 which can be made to engage with axial movement of the rods. Such elements are available commercially and may consist of, for example, a snap ring groove on the rod end and a spring-loaded ball bearing located in the associated hole. Thus, the locking parts 45 coordinated with the rods 40 are firmly connected to the rods 42, whereas the parts 47 coordinated with the rods 42 are held in the holes 43 with axial play. For clamping the parts located in the locking system, the locking parts 47 held in the lower part 2 are connected to pneumatic or hydraulic working cylinders 48.

Locking of the tool parts described above begins when, as the upper part 1 is driven in, the rods 40 enter the holes 41 of the slide elements 30 previously brought into the closed position and thus engage the locking parts 45, so that, as the movement continues, the rods 42 are pushed into the holes 43 and are further pressed into the locking parts 47. By subsequent actuation of the working cylinders 48, the locking system is clamped and is thus free from play. The press tool is prepared for the compression process by the punch 14. The locking system is released after the compression process by driving the upper part upward in the reverse manner.

For assembling and fastening the parts of the press tool which are described above, means familiar to the skilled worker are used; for the sake of clarity, these means are not shown in the drawing. The individual parts of the upper and lower part and the side walls and slide elements are held together, for example, by screw connections.

As indicated by the descriptions above, the tool is open on all sides, very greatly facilitating the introduction of the material to be molded and the removal of the molding. This also makes it easier to use handling mechanisms.

The press tool according to the invention has decisive advantages for the production process in the production of moldings from plastics, in particular from fiber composites. In contrast to the conventional, rigid and molding-specific single mold which is expensive and time-consuming to produce, the novel tool provides a large number of possibilities for making the production process economical, flexible and efficient and for reducing the tool costs to a minimum. Further advantages of the novel tool design are described below.

Only one basic unit has to be produced for the production of moldings, for example of prepregs consisting of reaction resin or thermoplastic prepregs, of different shapes and sizes. The design and dimensions of the basic unit are chosen to correspond with the largest molding to be produced. This basic unit permits any mold geometry, owing to the flexibility in designing the shape-imparting replaceable parts.

All guide elements and drive elements are part of the basic unit.

The mold costs are substantially reduced owing to the geometrically simple shape-imparting replaceable parts, i.e. the upper and lower punch and the two side walls.

The replaceable parts are protected and supported by the basic units surrounding them and therefore do not have to absorb the applied forces fully. This makes it possible to select various materials, such as steel, aluminum, brass, epoxy resin, ceramic, glass and plastics.

Radii on both the upper and lower surfaces of the molding are formed by a groove, corresponding to the molding contour, in the side walls during the production in the tool. This avoids parting of fibers, which occurred in the case of subsequent milling, which was previously necessary. This processing step is no longer required.

One of the two punches can be driven inside the basic unit, in the direction of the tool axis, by means of a working cylinder. Consequently, the compression cycle can take place independently of press control. The compression work and the compression pressure can be applied entirely within the basic unit independently of external apparatuses. Thus, it is possible to dispense with the use of expensive presses and instead to rely on more economical tool supports.

The lower punch can be pushed laterally out of the basic unit. This makes it possible to replace the punch between the press cycles in a mechanized operation, for example with a punch prepared outside the basic unit from new mold material.

I claim:

1. A press tool supportable by a support such as a press for the production of moldings from plastics, in particular from fiber-reinforced plastics, said tool having an axis and comprising a first part, a second part which is movable with respect to said first part, elements which define the mold cavity, drive elements for driving said mold cavity defining elements toward each other, said first and second parts together with said drive elements forming a basic unit, with said mold cavity defining elements being rigidly but replaceably held in said basic unit, and said mold cavity defining elements including parts which are drivable during the compression stroke of the tool and which are detachably connected to the respective drive elements, said last-mentioned mold cavity defining elements being in the form of a punch that is detachably connected to piston cylinder means which are included in said basic unit, and that is held for axial displacement in said second part of the tool, so that the compression pressure can be applied entirely within said basic unit.

2. A press tool as claimed in claim 1, wherein the shape-imparting parts are heatable.

3. A press tool as claimed in claim 1, wherein the first part of the tool is provided with working cylinders whose piston rods receive, at the free end, the second part of the tool, in order to guide and drive said second part.

4. A press tool as claimed in claim 1,
wherein said press tool is arranged to be connected to a press having a frame and a drive, and
wherein said first part is a lower part which is firmly connected to the press frame and the second part is an upper part which is connected to the drive of the press.

5. A press tool as claimed in claim 4, wherein, in order to form a double mold cavity, a mold core is arranged between the two punches.

6. A press tool as claimed in claim 1, wherein there is provided another punch detachably connected to said first part of the tool, and
wherein said mold cavity defining elements include side walls which are connected to corresponding slide elements and are arranged so that they can be displaced transversely and symmetrically with respect to the tool axis, on said first part.

7. A press tool as claimed in claim 6, wherein the side walls have shape-imparting recesses defining part of said mold cavity.

8. A press tool as claimed in claim 6, wherein the last-mentioned punch is displaceably held in guides of the first part and is arranged to be driven laterally out of said first part.

9. A press tool as claimed in claim 6, wherein slide elements which engage on the side walls are arranged on the first part of the tool so that they can be displaced toward the tool axis;
wherein guide elements are anchored in the second part of the tool, said slide elements being arranged to be driven through the medium of said guide elements.

10. A press tool as claimed in claim 9, wherein said slide elements which engage on the side walls are arranged on the first part of the tool so that they can be displaced transversely with respect to the tool axis, and wherein there are provided piston cylinder devices respectively connected to said slide elements.

11. A press tool as claimed in claim 9, wherein, in order to lock the tool parts brought into the closed position, the upper part and the slide elements are provided with rods and the slide elements and the first part are provided with holes which are coaxial with the rods in the last-mentioned position, the free end of the rods, on the one hand, and the holes, on the other hand, having locking elements which can be made to engage one another and, on the first part of the press, are connected to piston-cylinder devices.

* * * * *